United States Patent
Jang et al.

(10) Patent No.: US 10,153,488 B2
(45) Date of Patent: Dec. 11, 2018

(54) METHOD FOR PREPARING LITHIUM IRON PHOSPHATE NANOPOWDER COATED WITH CARBON

(71) Applicant: LG Chem, Ltd., Seoul (KR)

(72) Inventors: Wook Jang, Daejeon (KR); Seung Beom Cho, Daejeon (KR); In Kook Jun, Daejeon (KR)

(73) Assignee: LG Chem, Ltd. (KR)

( * ) Notice: Subject to any disclaimer, the term of this patent is extended or adjusted under 35 U.S.C. 154(b) by 115 days.

(21) Appl. No.: 14/421,633

(22) PCT Filed: Jan. 9, 2014

(86) PCT No.: PCT/KR2014/000266
§ 371 (c)(1),
(2) Date: Feb. 13, 2015

(87) PCT Pub. No.: WO2015/005551
PCT Pub. Date: Jan. 15, 2015

(65) Prior Publication Data
US 2015/0236347 A1    Aug. 20, 2015

(30) Foreign Application Priority Data

Jul. 9, 2013  (KR) .................. 10-2013-0080319
Jan. 8, 2014  (KR) .................. 10-2014-0002571

(51) Int. Cl.
*H01M 4/52*    (2010.01)
*H01M 4/04*    (2006.01)
*H01M 4/583*   (2010.01)

(52) U.S. Cl.
CPC .......... *H01M 4/521* (2013.01); *H01M 4/0402* (2013.01); *H01M 4/0471* (2013.01); *H01M 4/583* (2013.01)

(58) Field of Classification Search
CPC .......... H01M 4/52; H01M 4/521; H01M 4/04; H01M 4/0402; H01M 4/0471; H01M 4/583
See application file for complete search history.

(56) References Cited

U.S. PATENT DOCUMENTS 8,313,863 B2 * 11/2012 Exnar .................. C01B 25/45
                                                    252/506
2004/0151649 A1    8/2004 Hemmer et al.
(Continued)

FOREIGN PATENT DOCUMENTS

CN    1867514 A     11/2006
CN    101007630 A   8/2007
(Continued)

OTHER PUBLICATIONS

International Search Report for Application No. PCT/KR2014/000266 dated Apr. 28, 2014.
(Continued)

*Primary Examiner* — Karie O'Neill Apicella
(74) *Attorney, Agent, or Firm* — Lerner, David, Littenberg, Krumholz & Mentlik, LLP

(57) ABSTRACT

The present invention relates to a method for preparing a lithium iron phosphate nanopowder coated with carbon, including the steps of (a) preparing a mixture solution by adding a lithium precursor, an iron precursor and a phosphorus precursor in a glycol-based solvent, (b) putting the mixture solution into a reactor, heating and concentrating to prepare a metal glycolate slurry, (c) drying the metal glycolate slurry to form a solid content, and (d) firing the solid content to prepare the lithium iron phosphate nanopowder coated with carbon, and a lithium iron phosphate nanopowder coated with carbon prepared by the method.

15 Claims, 2 Drawing Sheets

(56) References Cited

U.S. PATENT DOCUMENTS

| | | |
|---|---|---|
| 2010/0233540 A1 | 9/2010 | Choy et al. |
| 2010/0233541 A1 | 9/2010 | Sano |
| 2010/0308277 A1 | 12/2010 | Grupp et al. |
| 2010/0323245 A1 | 12/2010 | Liang |
| 2011/0017947 A1 | 1/2011 | Nuspl et al. |
| 2011/0212365 A1* | 9/2011 | Audemer ............ C01B 25/45 429/221 |
| 2012/0003540 A1 | 1/2012 | Nakano et al. |
| 2012/0064408 A1 | 3/2012 | Song et al. |
| 2012/0328947 A1* | 12/2012 | Chou ............ H01M 4/5825 429/221 |
| 2013/0140497 A1 | 6/2013 | Nuspl et al. |
| 2013/0149227 A1 | 6/2013 | Chon et al. |
| 2014/0212756 A1 | 7/2014 | Sakaguchi et al. |

FOREIGN PATENT DOCUMENTS

| | | | |
|---|---|---|---|
| CN | 101635352 A | | 1/2010 |
| CN | 101719548 A | | 6/2010 |
| CN | 102074687 A | | 5/2011 |
| CN | 102332583 A | | 1/2012 |
| JP | 2005530676 A | | 10/2005 |
| JP | 2008130526 A | | 6/2008 |
| JP | 2010218838 A | | 9/2010 |
| JP | 2011210376 A | * 10/2011 | ............ H01M 4/58 |
| JP | 2012123909 A | | 6/2012 |
| JP | 2012155916 A | | 8/2012 |
| JP | 2012195156 A | | 10/2012 |
| JP | 2013539167 A | | 10/2013 |
| KR | 100808446 B1 | | 3/2008 |
| KR | 101003136 B1 | | 12/2010 |
| KR | 20110132566 A | | 12/2011 |
| KR | 20130066766 A | | 6/2013 |
| TW | 201029919 A | | 8/2010 |
| TW | 201301644 A | | 1/2013 |

OTHER PUBLICATIONS

Supplemental Search Report from European Application No. 14822223.5, dated Sep. 4, 2015.

Rangappa, et al. "Directed growth of nanoarchitectured LiFeP0O4 electrode by solvothermal synthesis and their cathode properties." Journal of Power Sources, Elsevier SA, CH, vol. 195, No. 18, Sep. 15, 2010, pp. 6167-6171, XP027148160.

Fedorková, et al., "Surface treatment of LiFePO4 cathode material with PPy/PEG conductive layer." Journal of Solid State Electrochemistry; Current Research and Development in Science and Technology, Springer, Berlin, DE, vol. 14, No. 12, Nov. 20, 2009, pp. 2173-2178, XP019861799.

Zhou, et al, "Additive-free solvothermal synthesis and Li-ion intercalation properties of dumbbell-shaped LiFePO4/C mesocrystals." Journal of Power Sources, Elsevier SA, CH, vol. 239, Apr. 2, 2013, pp. 103-110, XP028566954.

* cited by examiner

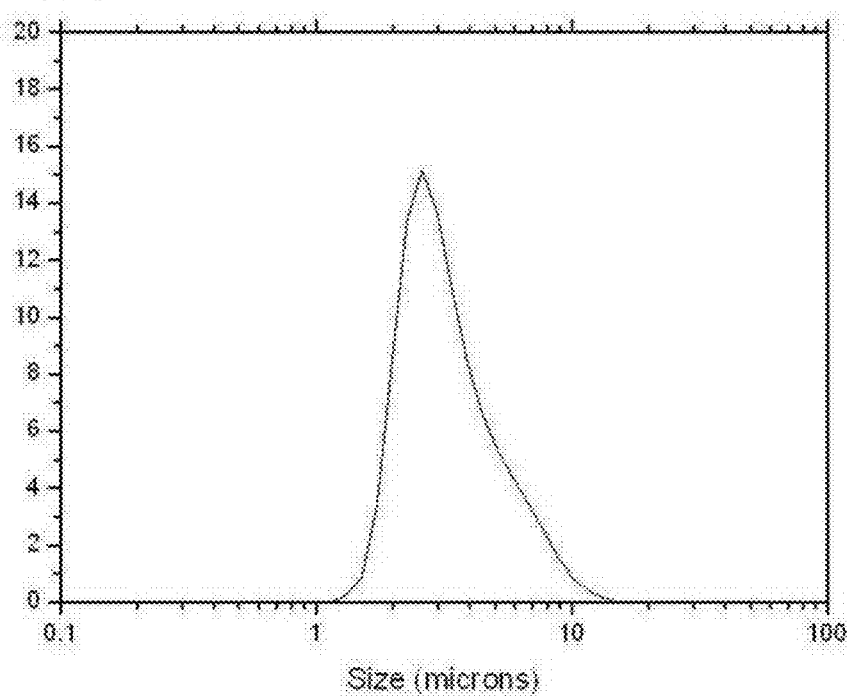

METHOD FOR PREPARING LITHIUM IRON PHOSPHATE NANOPOWDER COATED WITH CARBON

CROSS-REFERENCE TO RELATED APPLICATION

This application is a national phase entry under 35 U.S.C. § 371 of International Application No. PCT/KR2014/000266, filed Jan. 9, 2014, which claims priority to Korean Patent Application No. 10-2013-0080319, filed on Jul. 9, 2013 and Korean Patent Application No. 10-2014-0002571, filed on Jan. 8, 2014, the disclosures of which are incorporated herein by reference.

BACKGROUND OF THE INVENTION

1. Field of the Invention

The present invention relates to a method for preparing a lithium iron phosphate nanopowder coated with carbon.

2. Description of the Related Art

As technical development and consumption of mobile devices increase, the demand for secondary batteries as energy sources is suddenly increasing. Among such secondary batteries, lithium secondary batteries having high energy density and voltage, a long life cycle, and a low self-discharge rate are being commercialized and widely used.

Common lithium secondary batteries use lithium cobalt oxide ($LiCoO_2$) as the main component of a cathode active material. However, since the lithium containing cobalt oxide is unstable and expensive, the mass production of lithium secondary batteries including thereof is difficult.

Recently, lithium iron phosphate ($LiFePO_4$) compound having a voltage of ~3.5 V and a high volume density of 3.6 g/cm$^3$ when compared to lithium, having a theoretical capacity of 170 mAh/g, as well as having good stability at high temperature, and being cheap when compared to cobalt, is being viewed as a suitable cathode active material for a lithium secondary battery.

However, since a lithium iron phosphate compound has relatively low electron conductivity, when the compound is used as a cathode active material, the internal resistance of a battery may increase. Thus, to increase the conductivity, a conductive material is necessary to be coated thinly on the surface of lithium iron phosphate compound particles.

As methods for preparing the lithium iron phosphate compound, a solid phase method or a liquid phase method such as a hydrothermal synthesis method and a supercritical method is known. Recently, a glycothermal method using a non-aqueous solution such as ethylene glycol or diethylene glycol as a reaction solvent has been developed. To coat a conductive material on the surface of lithium iron phosphate compound particles prepared by the above-described methods, a method of mixing the lithium iron phosphate compound and the conductive material and firing is used. According to this method, the surfaces of the particles are coated with the conductive material during the conducting of a firing process. In this case, the conductive material is not uniformly dispersed on the surfaces of the particles.

SUMMARY OF THE INVENTION

An aspect of the present invention to resolve the above-described defects provides a method for preparing a lithium iron phosphate nanopowder, by which a mixture solution prepared by adding a lithium precursor, an iron precursor and a phosphorus precursor in a glycol-based solvent, is heated and concentrated to produce a slurry, and the slurry is dried and fired. According to the method, a lithium iron phosphate nanopowder including second particles is easily formed through the agglomeration of first particles obtained through the uniform coating of conductive carbon on the surfaces of the particles.

According to an aspect of the present invention, there is provided a method for preparing a lithium iron phosphate nanopowder coated with carbon including (a) preparing a mixture solution by adding a lithium precursor, an iron precursor and a phosphorus precursor in a glycol-based solvent, (b) putting the reaction mixture into a reactor, heating and concentrating to prepare a metal glycolate slurry; (c) drying the metal glycolate slurry to form a solid content; and (d) firing the solid content to prepare the lithium iron phosphate nanopowder coated with carbon.

According to another aspect of the present invention, there is provided a lithium iron phosphate nanopowder coated with carbon prepared by the method, including first particles having an olivine crystal structure, second particles obtained by the agglomeration of the first particles, and a carbon coating layer on a portion or on the whole of the surfaces of the first particles.

According to further another aspect of the present invention, there is provided a cathode active material including the lithium iron phosphate nanopowder coated with carbon, a cathode for a lithium secondary battery including the cathode active material, and a lithium secondary battery including the cathode.

According to the present invention, carbon which is a conductive carbon material may be uniformly coated on the first particles, and a lithium iron phosphate nanopowder having improved electric conductivity may be highly efficiently prepared.

A lithium secondary battery including the lithium iron phosphate nanopowder coated with carbon thus prepared as a cathode active material has good capacity and stability.

BRIEF DESCRIPTION OF THE DRAWINGS

The above and other aspects, features and other advantages of the present invention will be more clearly understood from the following detailed description taken in conjunction with the accompanying drawings, in which:

FIG. 3 illustrates particle size distribution of second particles of a lithium iron phosphate nanopowder prepared according to an embodiment of the present invention.

DETAILED DESCRIPTION OF THE PREFERRED EMBODIMENT

Figure 1:
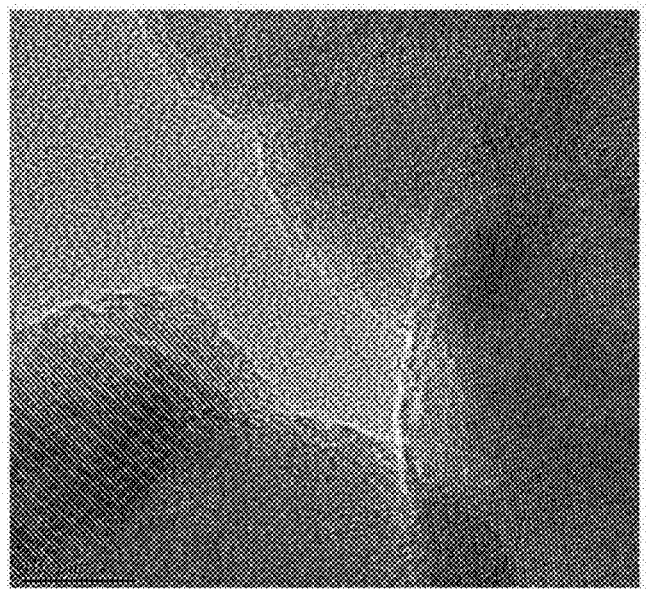
FIG. 1 is a photographic image of a scanning electron microscope (SEM) of first particles of a lithium iron phosphate nanopowder coated with carbon prepared according to an embodiment of the present invention.

Exemplary embodiments of the present invention will now be described in detail.

In the present invention, a novel method for preparing a lithium iron phosphate nanopowder coated with carbon by using a glycol-based solvent as a reaction solvent, and by heating and concentrating a mixture solution with a lithium precursor, an iron precursor and a phosphorus precursor is provided. According to the method, first particles (individual particles) may be uniformly coated with carbon, and a lithium iron phosphate nanopowder coated with carbon including second particles formed by agglomerating two or more of the first particles may be effectively prepared.

In an embodiment for attaining an aspect of the invention, a method for preparing a lithium iron phosphate nanopowder is provided, including (a) preparing a mixture solution by adding a lithium precursor, an iron precursor and a phosphorus precursor in a glycol-based solvent, (b) putting the reaction mixture into a reactor, heating and concentrating to prepare a metal glycolate slurry; (c) drying the metal glycolate slurry to form a solid content; and (d) firing the solid content to prepare the lithium iron phosphate nanopowder coated with carbon.

Hereinafter the method will be described in detail step by step.

Preparation of Mixture Solution (Step a)

First, a lithium precursor, an iron precursor, and a phosphorus precursor are prepared and added in a glycol-based solvent to prepare a homogeneous mixture solution.

The lithium precursor thus added may be at least one selected from the group consisting of lithium acetate dihydrate ($CH_3COOLi.2H_2O$), lithium hydroxide monohydrate ($LiOH.H_2O$), lithium hydroxide (LiOH), lithium carbonate ($Li_2CO_3$), lithium phosphate ($Li_3PO_4$), lithium phosphate dodecahydrate ($Li_3PO_4.12H_2O$) and lithium oxalate ($Li_2C_2O_4$), or a mixture of two or more thereof.

The iron precursor added may be at least one selected from the group consisting of iron citrate ($FeC_6H_5O_7$), iron citrate hydrate ($FeC_6H_5O_7.nH_2O$), ferrous sulfate heptahydrate ($FeSO_4.7H_2O$), iron(II) oxalate dihydrate ($FeC_2O_4.2H_2O$), iron acetyl acetonate ($Fe(C_5H_7O_2)_3$), iron phosphate dihydrate ($FePO_4.2H_2O$) and ferric hydroxide (FeO(OH)), or a mixture of two or more thereof.

The phosphorus precursor added may be at least one selected from the group consisting of tri-ammonium phosphate trihydrate (($NH_4)_3PO_4.3H_2O$), ammonium phosphate (($NH_4)_2HPO_4$), ammonium dihydrogen phosphate ($NH_4H_2PO_4$) and phosphoric acid ($H_3PO_4$), or a mixture of two of more thereof.

In the present invention, a non-aqueous glycol-based solvent is used as a reaction solvent.

The glycol-based solvent means dihydric alcohols represented by a general formula of $R(OH)_2$. In an embodiment of the present invention, the glycol-based solvent may be selected from the group consisting of ethylene glycol, diethylene glycol and 1,4-butandiol.

Meanwhile, the mixing ratio of the lithium precursor, the iron precursor and the phosphorus precursor during the forming of the mixture solution is not specifically limited, and may be, for example, 1.0-1.2:1:1.0-1.2 by the molar ratio.

In addition, the iron precursor may be added from about 0.5 to about 10 parts by weight based on 100 parts by weight of the glycol-based solvent, and the lithium precursor and the phosphorus precursor may be added by corresponding molar ratios considering the amount of the iron precursor.

A stirring step may be further conducted during preparing the mixture solution so that the lithium precursor, the iron precursor and the phosphorus precursor may be homogeneously dispersed in the reaction solvent.

Preparation of Slurry (Step b)

Then, the mixture solution is put into a reactor, and heated and concentrated to prepare a metal glycolate slurry.

The reactor may be a generally used reactor for preparing a lithium iron phosphate nanopowder in the art, and the kind thereof is not specifically limited in the present invention. For example, an open type reactor or a closed-type reactor may be used.

In the heating and concentrating process, the heating may be performed to a temperature of at least the boiling point of the glycol-based solvent, which is used as the reaction solvent, and the mixture solution may be stirred in a high rate at the same time.

Meanwhile, in the heating and concentrating process in the above Step (b), the stirring rate for preparing the slurry may be at least 10 rpm to prepare a uniform glycolate, and preferably may be, for example, in a range of 10 to 200 rpm.

The time for the heating and concentrating depends on the kind of the glycol-based solvent used, supplied calories for the heating, the stirring rate, etc., and may be from 1 to 5 hours.

In an embodiment of the present invention, when ethylene glycol having a boiling point of at least about 197° C., is used as the glycol-based solvent, the heating and concentrating may be performed for at least about 200° C. for 2 to 5 hours.

The heating and concentrating in the above Step (b) may be conducted under the pressure conditions of atmospheric pressure (1 atm) to 10 bar. However, the pressure conditions are not specifically limited.

Through the conducting of the heating and concentrating process, a metal glycolate slurry is prepared.

Drying (Step c)

The metal glycolate slurry thus prepared was dried to obtain a solid content.

The drying method in the drying step is not specifically limited, and may be conducted at a temperature range of 100 to 180° C. in a convention oven.

When the drying temperature is less than 100° C., the glycol-based solvent used may be insufficiently dried, and when the drying temperature exceeds 180° C., the glycol-based solvent used may be partially pyrolyzed, and a uniform carbon coating layer may not be formed on the particles.

Firing (Step d)

A lithium iron phosphate nanopowder coated with carbon may be prepared by firing the solid content obtained by drying the metal glycolate slurry.

In an embodiment of the present invention, the firing may be performed at a temperature range of 400 to 900° C. for 2 to 10 hours. When the firing temperature is less than 400° C., the formation of a lithium iron phosphate crystal is difficult, and when the firing temperature exceeds 900° C., a by-product other than the lithium iron phosphate may be produced.

Meanwhile, the firing may be conducted under an anaerobic atmosphere or an inert gas atmosphere. In an embodiment of the present invention, the firing step may be conducted under an argon (Ar) gas atmosphere.

Through the firing, the lithium iron phosphate nanopowder may be prepared, and a small amount of the glycol-based reaction solvent that remains in the solid content may be carbonized during the firing, thereby forming a carbon coating layer on the surfaces of the first particles of the lithium iron phosphate nanopowder.

Particularly, the glycol-based solvent that remains in the solid content is partially carbonized in the firing step to form a coating layer on the surfaces of the first particles, and a portion of the remaining solvent is vaporized to induce the agglomeration of the first particles of the lithium iron phosphate nanopowder thus prepared, thereby producing a lithium iron phosphate nanopowder including the second particles having uniform particle size and particle size distribution. According to the present invention, a separate process is not conducted for the carbon coating during the preparing of the lithium iron phosphate nanopowder coated with carbon, and process efficiency and economic feasibility are good. Meanwhile, since the carbon coating layer formed on the surfaces of the particles has conductivity, the insufficient conductivity of the lithium iron phosphate nanopowder may be supplemented.

In the lithium iron phosphate nanopowder prepared through the series of processes, the first particles have an olivine crystal structure, and the second particles obtained through agglomerating two or more first particles are included.

The first particles are individual unit particles forming the second particles and have an olivine crystal structure. In addition, the first particles include a carbon coating layer uniformly coated on a portion or the whole of the surfaces of the particles.

The thickness of the carbon coating layer may be from 0.5 to 5 nm. Since the carbon coating layer is formed on the surfaces of the particles, the electric conductivity of the lithium iron phosphate compound may be supplemented.

Meanwhile, the average particle diameter (D50) of the first particles may be from 20 to 100 nm, and the average particle diameter (D50) of the second particles composing a plurality of the agglomerated first particles may be from 50 to 1,000 nm. The particle size distribution of the second particles prepared according to an embodiment of the present invention may be uniform, and the particle size distribution may be, for example, less than or equal to 15% (See FIG. 3).

Realization of Lithium Secondary Battery

In the present invention, a cathode active material including the lithium iron phosphate nanopowder having the olivine crystal structure may be provided. The cathode active material may further include a conductive agent, a binder and a filler other than the lithium iron phosphate powder selectively.

The conductive agent may include any material having conductivity and not inducing a chemical change in a battery without specific limitation, and may include graphite such as natural graphite and synthetic graphite; carbon blacks such as carbon black, acetylene black, ketchen black, channel black, furnace black, lamp black, and thermal black; conductive fibers such as a carbon fiber and a metal fiber; metal powders such as a carbon fluoride powder, an aluminum powder and a nickel powder; conductive whiskers such as zinc oxide and potassium titanate; conductive metal oxides such as titanium oxide; and conductive materials such as a polyphenylene derivative.

Generally, the conductive agent may be included by 1 to 30 wt % based on the total amount of a mixture including the cathode active material.

The binder may be any component that assists the bonding of the active material and the conductive agent and the bonding with a current collector without specific limitation, and may include, for example, polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated EPDM, a styrene butadiene rubber, a fluorine rubber, various copolymers, etc.

Generally, the binder may be included by 1 to 30 wt % based on the total amount of a mixture including the cathode active material.

The filler is a component suppressing the expansion of an electrode and may be selectively used. The filler may be any fibrous material that may not induce a chemical change in a battery, without specific limitation, and may include, for example, an olefin-based polymer such as polyethylene and polypropylene; and a fibrous material such as a glass fiber and a carbon fiber.

In addition, in an embodiment of the present invention, a cathode for a lithium secondary battery obtained by coating the cathode active material on a current collector is provided.

The cathode for the lithium secondary battery may be fabricated by, for example, dissolving the cathode active material in a solvent to prepare a slurry, coating the slurry on the current collector, drying and pressing.

The current collector of the cathode may be any material having conductivity and not inducing chemical change of a battery, without specific limitation, and may include, for example, stainless steel, aluminum, nickel, titanium, fired carbon, or a surface treated material of the aluminum or the stainless steel with carbon, nickel, titanium, silver, etc.

Generally, the current collector may have a thickness of 3 to 500 μm, and minute embossing may be formed on the surface of the current collector to increase the adhesiveness of the cathode active material.

Various shapes such as a film, a sheet, a foil, a net, a porous material, a foamed material, a non-woven fabric, etc. may be used as the current collector.

In addition, in an embodiment of the present invention, a lithium secondary battery including a cathode including the cathode active material, an anode, a separator and anonaqueous electrolyte containing a lithium salt may be provided.

The anode may be fabricated by, for example, coating an anode mixture including an anode active material on an anode current collector, and drying. In the anode mixture, the above-described components such as the conductive agent, the binder and the filler may be included as occasion demands.

The anode current collector may be any material having high conductivity and not inducing the chemical change of a battery, without specific limitation, and may include, for example, copper, stainless steel, aluminum, nickel, fired carbon, a surface treated material of copper or stainless steel with carbon, nickel, titanium, silver, etc., and an alloy of aluminum-cadmium.

Meanwhile, the current collector may have the thickness of 3 to 500 μm, and minute embossing may be formed on the surface of the current collector to increase the adhesiveness of the anode active material as in the cathode current collector. Various shapes such as a film, a sheet, a foil, a net, a porous material, a foamed material, a non-woven fabric, etc. may be used as the current collector.

The separator is disposed between the cathode and the anode, and an insulating thin film having high ion transmittance and high mechanical strength may be used.

The pore diameter of the separator may be generally from 0.01 to 10 μm, and the thickness thereof may be generally from 5 to 300 μm.

The separator may include a chemical resistant and hydrophobic olefin-based polymer such as polypropylene; a sheet or a non-woven fabric formed by using a glass fiber or polyethylene, etc.

When a solid electrolyte such as a polymer is used as the electrolyte, the solid electrolyte may also play the role of the separator.

The non-aqueous electrolyte containing the lithium salt includes the electrolyte and the lithium salt, and the electrolyte may include a non-aqueous organic solvent or an organic solid electrolyte.

The non-aqueous organic solvent may include, for example, aprotic organic solvents such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc. The organic solid electrolyte may include, for example, polyethylene derivatives, polyethylene oxide derivatives, polypropylene oxide derivatives, a phosphoric acid ester polymer, poly agitation lysine, polyester sulfide, polyvinyl alcohol, polyvinylidene fluoride, and a polymer containing an ionic dissociable group.

The lithium salt may include a material favorably soluble in the non-aqueous electrolyte such as LiCl, LiBr, LiI, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, a low molecular weight aliphatic lithium carbonate, lithium 4-phenylborate, imide, etc.

In addition, the electrolyte may further include (for improving charge and discharge properties, and flame retardance, etc.), for example, pyridine, triethyl phosphite, triethanolamine, a cyclic ether, ethylenediamine, n-glyme, hexaphosphoric acid amide, nitrobenzene derivatives, sulfur, a quinone imine dye, N-substituted oxazolidinone, N,N-substituted imidazolidine, an ethylene glycol dialkyl ether, an ammonium salt, pyrrole, 2-methoxyethanol, trichloro aluminum, etc. A halogen-containing solvent such as carbon tetrachloride, trifluoroethylene, etc. may be further included to impart incombustibility, and a carbon dioxide gas may be further included to improve preservation properties at a high temperature.

EXAMPLES

Exemplary embodiments of the invention will be described below in more detail. The present invention may, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1

6.29 g of lithium hydroxide monohydrate ($LiOH.H_2O$), 36.74 g of ferric citrate hydrate ($FeC_6H_5O_7.nH_2O$) and 14.7 g of phosphoric acid ($H_3PO_4$) were added in 500 g of ethylene glycol and stirred using a mixer having a high shearing force (IKA) at 10,000 rpm for 30 minutes so as to be homogeneously dispersed.

The sufficiently dispersed mixture solution was stirred on a hot plate by using a magnetic bar at 400 rpm, and was heated and concentrated at 200° C. for 3 hours to produce 150 g of a glycolate slurry.

The glycolate slurry thus obtained was dried at 120° C. for 10 hours to produce a solid content from which the ethylene glycol was vaporized.

Figure 2:
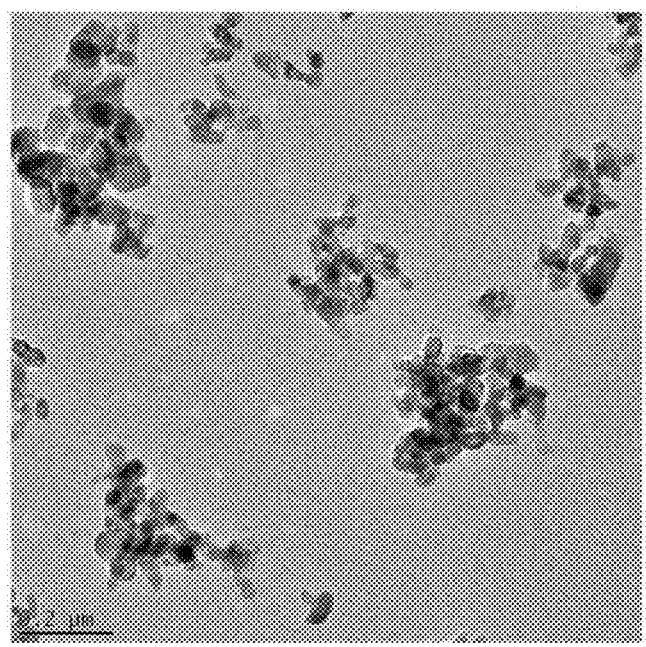
FIG. 2 is a photographic image of a scanning electron microscope (SEM) of second particles of a lithium iron phosphate nanopowder coated with carbon prepared according to an embodiment of the present invention.

The solid content thus obtained was fired in a furnace under an argon (Ar) atmosphere at 500° C. for 5 hours to form individual lithium iron phosphate particles coated with carbon (first particles) (See FIG. 1) and to form a lithium iron phosphate nanopowder including agglomerated lithium iron phosphate particles (second particles) of the above first particles in a successive reaction at the same time (See FIG. 2).

In addition, the particle size distribution of the lithium iron phosphate nanopowder thus prepared was measured and is illustrated as a graph in FIG. 3.

The physical properties of the first particles and the second particles thus prepared are illustrated in the following Table 1.

Example 2

A lithium iron phosphate nanopowder was prepared by performing the same procedure described in Example 1, except that 41.70 g of ferric sulfate heptahydrate ($FeSO_4.7H_2O$) was added instead of ferric citrate hydrate as an iron precursor.

The physical properties of the second particles included in the lithium iron phosphate nanopowder thus prepared and the first particles forming the second particles are illustrated in the following Table 1.

Example 3

A lithium iron phosphate nanopowder was prepared by performing the same procedure described in Example 1, except that the firing temperature was 700° C. instead of 500° C.

The physical properties of second particles included in the lithium iron phosphate nanopowder thus prepared and first particles forming the second particles are illustrated in the following Table 1.

Example 4

A lithium iron phosphate nanopowder was prepared by performing the same procedure described in Example 1, except that 35 g of ferric citrate hydrate was added.

The physical properties of second particles included in the lithium iron phosphate nanopowder thus prepared and first particles forming the second particles are illustrated in the following Table 1.

Example 5

A lithium iron phosphate nanopowder was prepared by performing the same procedure described in Example 1, except that 1,4-butanediol was used instead of ethylene glycol as a solvent.

The physical properties of the second particles included in the lithium iron phosphate nanopowder thus prepared and the first particles forming the second particles are illustrated in the following Table 1.

Comparative Example 1

Lithium iron phosphate compound particles were prepared by using a common solid phase method, and the physical properties thereof are illustrated in the following Table 1.

TABLE 1

|  | Average particle diameter of first particles of lithium iron phosphate nanopowder (D50, nm) | Average particle diameter of second particles of lithium iron phosphate nanopowder (D50, nm) | Thickness of carbon coating layer (nm) |
|---|---|---|---|
| Example 1 | 40 | 500 | 1.5 |
| Example 2 | 45 | 600 | 1.3 |
| Example 3 | 40 | 600 | 1.3 |
| Example 4 | 40 | 550 | 1.5 |
| Example 5 | 50 | 300 | 2 |
| Comparative Example 1 | 250 | 3,000 | Non-uniform |

As shown in the above Table 1, the particle size and the thickness of the carbon coating layer of the lithium iron phosphate nanopowder prepared according to the present invention were uniformly controlled. As confirmed in FIG. 3, the particle size distribution of the lithium iron phosphate nanopowder prepared according to the present invention is uniform.

Experiment 1 (Manufacture of Lithium Secondary Battery)
Step 1: Manufacture of Cathode Using Lithium Iron Phosphate A slurry was prepared by mixing the lithium iron phosphate prepared in each of the examples and the comparative example, carbon black as a conductive agent, and polyvinylidene fluoride (PVdF) as a binder at a weight ratio of 95:3:2, and using an N-methyl pyrrolidone (NMP) solvent. The slurry thus prepared was coated on an aluminum foil, dried at 130° C. for 2 hours to manufacture a cathode, and roll pressed.

Step 2: Manufacture of Anode

A slurry was prepared by mixing natural graphite, carbon black as a conductive agent, and a styrene-butyrene rubber (SBR) at a weight ratio of 93:1:6. The slurry thus prepared was coated on a copper foil, dried at 110° C. for 2 hours to manufacture an anode, and roll pressed.

Step 3: Assembling Battery

A coin cell-type battery was completed by using the cathode and the anode thus manufactured and a polyethylene separator (Tonen Chemical Corporation, R20BHE, thickness=20 μm), and by injecting an electrolyte (1 mol of lithium hexafluorophosphate (LiPF$_6$), and ethylene carbonate (EC)/ethyl methyl carbonate (EMC)=½ by volume).

The battery properties of the battery thus manufactured were evaluated under voltage conditions of 3.0 V to 4.3 V. The measured results on the capacity and the energy density of the battery thus manufactured are illustrated in the following Table 2.

TABLE 2

|  | Initial capacity (mAh/g) | 1$^{st}$ EFFICIENCY (%) | 1 C/ 0.1 C (%) | 2 C/ 0.1 C (%) |
|---|---|---|---|---|
| Example 1 | 157 | 98 | 96 | 94 |
| Example 2 | 157 | 97 | 95 | 93 |
| Example 3 | 156 | 98 | 95 | 93 |
| Example 4 | 158 | 97 | 96 | 94 |
| Example 5 | 157 | 98 | 97 | 95 |
| Comparative Example 1 | 156 | 96 | 89 | 82 |

Referring to the results in the above Table 2, it may be confirmed that the lithium secondary batteries manufactured by including the lithium iron phosphate nanopowders prepared according to the examples of the present invention (Examples 1 to 5) showed improved performance in terms of battery capacity and energy density when compared to the lithium secondary battery manufactured by including the lithium iron phosphate nanopowder prepared according to Comparative Example 1.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for preparing a lithium iron phosphate nanopowder having a carbon coating layer, comprising the steps of:
   (a) preparing a mixture solution comprising a lithium precursor, an iron precursor, a phosphorus precursor, and a glycol-based solvent;
   (b) heating the mixture solution to a temperature of at least a boiling point of the glycol-based solvent used and concentrating to prepare a metal glycolate slurry;
   (c) drying the metal glycolate slurry to form a solid content; and
   (d) firing the solid content at a temperature ranging from 400° C. to 900° C. in an anaerobic or inert gas atmosphere to prepare the lithium iron phosphate nanopowder having the carbon coating layer.

2. The method of claim 1, wherein the heating and concentrating in Step (b) is performed under pressure conditions less than or equal to 10 bar.

3. The method of claim 1, wherein the drying in Step (c) is performed in a convention oven at a temperature range of 100 to 180° C.

4. The method of claim 1, wherein the firing of Step (d) is performed at a temperature range of 400 to 900° C. for 2 to 10 hours.

5. The method of claim 1, wherein the glycol-based solvent is selected from the group consisting of ethylene glycol, diethylene glycol and 1,4-butandiol.

6. The method of claim 1, wherein the lithium precursor is at least one selected from the group consisting of lithium acetate dihydrate (CH$_3$COOLi.2H$_2$O), lithium hydroxide monohydrate (LiOH.H$_2$O), lithium hydroxide (LiOH), lithium carbonate (Li$_2$CO$_3$), lithium phosphate (Li$_3$PO$_4$), lithium phosphate dodecahydrate (Li$_3$PO$_4$.12H$_2$O) and lithium oxalate (Li$_2$C$_2$O$_4$), or a mixture of two or more thereof.

7. The method of claim 1, wherein the iron precursor is at least one selected from the group consisting of iron citrate (FeC$_6$H$_5$O$_7$), iron citrate hydrate (FeC$_6$H$_5$O$_7$.nH$_2$O), ferrous sulfate heptahydrate (FeSO$_4$.7H$_2$O), iron(II) oxalate dihydrate (FeC$_2$O$_4$.2H$_2$O), iron acetyl acetonate (Fe(C$_5$H$_7$O$_2$)$_3$), iron phosphate dihydrate (FePO$_4$.2H$_2$O) and ferric hydroxide (FeO(OH)), or a mixture of two or more thereof.

8. The method of claim 1, wherein the phosphorus precursor is at least one selected from the group consisting of tri-ammonium phosphate trihydrate ((NH$_4$)$_3$PO$_4$.3H$_2$O), ammonium phosphate ((NH$_4$)$_2$HPO$_4$), ammonium dihydrogen phosphate (NH$_4$H$_2$PO$_4$) and phosphoric acid (H$_3$PO$_4$), or a mixture of two of more thereof.

9. A lithium iron phosphate nanopowder having a carbon coating layer, comprising:
   second particles, wherein the second particles are agglomerates of a plurality of first particles, wherein the first particles have an olivine crystal structure; and
   a carbon coating layer disposed on a portion or a whole of a surface of the first particle, wherein an average particle diameter (D50) of the second particles is from 300 to 1,000 nm, and wherein an average particle diameter (D50) of the first particles is from 20 to 100 nm.

10. The lithium iron phosphate nanopowder having the carbon coating layer of claim 9, wherein a thickness of the carbon coating layer is from 0.5 to 5 nm.

11. The lithium iron phosphate nanopowder having the carbon coating layer of claim 9, wherein the lithium iron phosphate is $LiFePO_4$.

12. A cathode active material comprising the lithium iron phosphate nanopowder having the carbon coating layer of claim 10.

13. The cathode active material of claim 12, further comprising at least one selected from a conductive agent, a binder and a filler.

14. A cathode for a lithium secondary battery comprising a cathode current collector and the cathode active material of claim 12 coated on the cathode current collector.

15. A lithium secondary battery comprising the cathode of claim 14, an anode, a separator and a non-aqueous electrolyte comprising a lithium salt.

\* \* \* \* \*